US012290058B2

United States Patent
Pulkrabek

(10) Patent No.: US 12,290,058 B2
(45) Date of Patent: *May 6, 2025

(54) LEFT HANDED FISHING REEL

(71) Applicant: TrikaUSA Inc., Superior, WI (US)

(72) Inventor: Larry Pulkrabek, Superior, WI (US)

(73) Assignee: TrikaUSA Inc., Superior, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/596,000

(22) Filed: Mar. 5, 2024

(65) Prior Publication Data

US 2024/0245043 A1    Jul. 25, 2024

Related U.S. Application Data

(63) Continuation of application No. 18/111,024, filed on Feb. 17, 2023, now Pat. No. 11,957,117, which is a continuation of application No. 17/740,524, filed on May 10, 2022, now Pat. No. 11,612,155, which is a continuation of application No. 16/906,806, filed on Jun. 19, 2020, now Pat. No. 11,350,617.

(60) Provisional application No. 62/864,945, filed on Jun. 21, 2019.

(51) Int. Cl.
*A01K 89/01*    (2006.01)
*A01K 89/00*    (2006.01)

(52) U.S. Cl.
CPC ...... *A01K 89/004* (2015.05); *A01K 89/01083* (2015.05)

(58) Field of Classification Search
CPC ............... A01K 89/004; A01K 89/003; A01K 89/01082; A01K 89/01083; A01K 89/0105
See application file for complete search history.

(56) References Cited

U.S. PATENT DOCUMENTS

| | | |
|---|---|---|
| 2,863,616 A | 12/1958 | Hutchison et al. |
| 2,974,895 A | 3/1961 | Wood |
| 4,196,867 A | 4/1980 | Miller |
| 6,318,654 B1 | 11/2001 | Amano et al. |
| 6,457,662 B1 | 10/2002 | Sato |
| D472,297 S | 3/2003 | Hashimoto |
| 6,598,819 B2 | 7/2003 | Furomoto |
| 6,626,385 B1 | 9/2003 | Tsutsumi |
| 6,637,690 B2 | 10/2003 | Matsuda |
| D500,834 S | 1/2005 | Nago |
| D501,528 S | 2/2005 | Nago |
| D504,491 S | 4/2005 | Iwabuchi |

(Continued)

OTHER PUBLICATIONS

International Search Report and Written Opinion for International Application No. PCT/US2020/038737 dated Aug. 28, 2020, 13 pages.

*Primary Examiner* — Emmanuel M Marcelo

(74) *Attorney, Agent, or Firm* — Foley & Lardner LLP

(57) ABSTRACT

A fishing reel includes a support member, a bail assembly, an input shaft, and a gear box, according to an exemplary embodiment. The bail assembly is coupled with the support member. The bail assembly is configured to retrieve or let out a fishing line. The input shaft is configured to receive an input torque. The gear box is configured to be driven by the input shaft and drive the bail assembly to retrieve the fishing line. The input shaft is configured to receive the input torque in a clockwise direction and drive the bail assembly to operate in a counter-clockwise direction to retrieve the fishing line.

20 Claims, 2 Drawing Sheets

(56) References Cited

U.S. PATENT DOCUMENTS

| | | |
|---|---|---|
| 6,880,776 B2 | 4/2005 | Kitajima |
| 6,883,738 B2 | 4/2005 | Nakajima et al. |
| 6,902,127 B2 | 6/2005 | Nishikawa |
| 6,932,292 B2 | 8/2005 | Tsutsumi et al. |
| 6,955,316 B2 | 10/2005 | Kitajima |
| 7,066,419 B2 | 6/2006 | Myojo et al. |
| 7,070,138 B2 | 7/2006 | Iwabuchi et al. |
| D529,123 S | 9/2006 | Nago |
| D529,125 S | 9/2006 | Iwabuchi |
| 7,118,059 B2 | 10/2006 | Morise |
| 7,121,491 B2 | 10/2006 | Kitajima |
| D561,871 S | 2/2008 | Iwabuchi |
| D574,461 S | 8/2008 | Nago |
| 7,413,138 B2 | 8/2008 | Kitajima et al. |
| D579,513 S | 10/2008 | Iwabuchi |
| D585,105 S | 1/2009 | Nago |
| 7,537,178 B2 | 5/2009 | Saito |
| D593,638 S | 6/2009 | Nago |
| D595,806 S | 7/2009 | Nago |
| 7,607,602 B2 | 10/2009 | Hiraoka et al. |
| 7,721,986 B2 | 5/2010 | Shimizu |
| D620,071 S | 7/2010 | Noma |
| D620,073 S | 7/2010 | Tabuse et al. |
| 7,802,744 B2 | 9/2010 | Saito |
| D627,417 S | 11/2010 | Nago |
| 8,152,087 B2 | 4/2012 | Hayashi |
| D684,657 S | 6/2013 | Asaba |
| 8,925,847 B2 | 1/2015 | Saito |
| 8,950,697 B2 | 2/2015 | Takamatsu et al. |
| 9,055,735 B2 | 6/2015 | Hiraoka |
| 9,149,029 B2 | 10/2015 | Hiraoka |
| 9,295,242 B2 | 3/2016 | Hiraoka |
| 9,363,988 B2 | 6/2016 | Matsuo et al. |
| 9,370,173 B2 | 6/2016 | Matsuo et al. |
| 9,497,948 B2 | 11/2016 | Matsuo et al. |
| 9,770,016 B2 | 9/2017 | Chan |
| 9,861,084 B2 | 1/2018 | Ochiai et al. |
| 10,028,494 B2 | 7/2018 | Ikebukuro |
| 10,058,081 B2 | 8/2018 | Ochiai |
| 10,244,744 B2 | 4/2019 | Ikebukuro |
| 10,278,377 B2 | 5/2019 | Saito |
| 10,334,833 B2 | 7/2019 | Ikebukuro et al. |
| 10,349,644 B2 | 7/2019 | Ikebukuro |
| 11,350,617 B2 * | 6/2022 | Pulkrabek ........ A01K 89/01083 |
| 2002/0175236 A1 | 11/2002 | Hitomi |
| 2005/0189446 A1 | 9/2005 | Myojo |
| 2012/0266705 A1 | 10/2012 | Little et al. |
| 2015/0250156 A1 | 9/2015 | Hui |
| 2019/0069532 A1 | 3/2019 | Saito et al. |
| 2019/0098884 A1 | 4/2019 | Saito et al. |
| 2019/0104713 A1 | 4/2019 | Saito et al. |
| 2019/0124901 A1 | 5/2019 | Takamatsu et al. |
| 2019/0124903 A1 | 5/2019 | Takamatsu et al. |
| 2019/0350182 A1 | 11/2019 | Wong et al. |
| 2020/0022347 A1 | 1/2020 | Kusuda |
| 2020/0022349 A1 | 1/2020 | Hui |

* cited by examiner

LEFT HANDED FISHING REEL

CROSS-REFERENCE TO RELATED PATENT APPLICATION

This application is a continuation of U.S. application Ser. No. 18/111,024, filed Feb. 17, 2023, issued as U.S. Pat. No. 11,957,117, which is a continuation of U.S. application Ser. No. 17/740,524, filed May 10, 2022, issued as U.S. Pat. No. 11,612,155, which is a continuation of U.S. application Ser. No. 16/906,806, filed Jun. 19, 2020, issued as U.S. Pat. No. 11,350,617, which claims the benefit of and priority to U.S. Provisional Patent Application No. 62/864,945, filed Jun. 21, 2019, the entire disclosures of which are all incorporated by reference herein.

BACKGROUND

The present disclosure relates generally to fishing reels. More particularly, the present disclosure relates to left handed spinning reels.

SUMMARY

One implementation of the present disclosure is a fishing reel including a support member, a bail assembly, an input shaft, and a gear box, according to an exemplary embodiment. The bail assembly is coupled with the support member. The bail assembly is configured to retrieve or let out a fishing line. The input shaft is configured to receive an input torque. The gear box is configured to be driven by the input shaft and drive the bail assembly to retrieve the fishing line. The input shaft is configured to receive the input torque in a clockwise direction and drive the bail assembly to operate in a counter-clockwise direction to retrieve the fishing line.

In some embodiments, the fishing reel is configured for use by a left-handed operator. The input shaft is configured to receive the input torque from a right hand of the left-handed operator.

In some embodiments, the support member is configured to fixedly couple with a pole. The input shaft extends laterally outwards along a first axis from a right side of the fishing reel and the clockwise direction is defined along the first axis extending centrally through the input shaft. The bail assembly is centered about a second axis, the second axis substantially perpendicular with the first axis that extends centrally through the input shaft. The bail assembly is configured to operate in the counter-clockwise direction about the second axis to retrieve the fishing line.

In some embodiments, the bail assembly includes a bail arm, a roller, and a spool. The bail arm extends between opposite portions of a rotor. The roller is positioned at an end portion of the rotor and terminates at the roller. The rotor, the bail arm, and the roller rotate in the counter-clockwise direction relative to the spool to retrieve the fishing line and wind the fishing line onto the spool.

In some embodiments, the bail arm, the roller, and the spool are transitionable between a take up position and a let out position to configure the fishing reel to take up or let out the fishing line.

In some embodiments, the fishing reel further includes a handle rotatably coupled with the input shaft. The handle is configured to receive the input torque from an operator's right hand and transfer the input torque to the input shaft.

In some embodiments, a direction of rotation of the handle and a direction of rotation of the bail assembly during take-up of the fishing line do not oppose each other.

Another implementation of the present disclosure is a fishing rod, according to an exemplary embodiment. The fishing rod includes an elongated member and a fishing reel. The fishing reel includes a support member, a bail assembly, an input shaft, and a gear box. The support member is configured to fixedly couple with the elongated member. The bail assembly is configured to retrieve or let out a fishing line. The input shaft is configured to receive an input torque. The gear box is configured to be driven by the input shaft and drive the bail assembly to retrieve the fishing line. The input shaft is configured to receive the input torque in a clockwise direction and rive the bail assembly to operate in a counter-clockwise direction to retrieve the fishing line.

In some embodiments, the fishing rod is configured to be held with an operator's left hand and operated with an operator's right hand.

In some embodiments, the input shaft extends laterally outwards along a first axis from a right side of the fishing reel and the clockwise direction is defined along the first axis extending centrally through the input shaft. The bail assembly is centered about a second axis, the second axis substantially perpendicular with the first axis that extends centrally through the input shaft. The bail assembly is configured to operate in the counter-clockwise direction about the second axis to retrieve the fishing line.

In some embodiments, the bail assembly includes a bail arm, a roller, and a spool. The bail arm extends between opposite portions of a rotor. The roller is positioned at an end portion of the rotor and terminates at the roller. The rotor, the bail arm, and the roller rotate in the counter-clockwise direction relative to the spool to retrieve the fishing line and wind the fishing line onto the spool.

In some embodiments, the bail arm, the roller, and the spool are transitionable between a take up position and a let out position to configured to fishing reel to take up or let out the fishing line.

In some embodiments, the fishing rod further includes a handle rotatably coupled with the input shaft. The handle is configured to receive the input torque from an operator's right hand and transfer the input torque to the input shaft.

In some embodiments, a direction of rotation of the handle and a direction of rotation of the bail assembly during take-up of the fishing line do not oppose each other.

In some embodiments, the fishing line has a rest position in a coiled position, the coiled position having a counter-clockwise wind direction to configure the fishing line for use with the fishing reel.

Another implementation of the present disclosure is a left-handed spinning reel, according to an exemplary embodiment. The spinning reel includes a body, a spool, and a bail arm. The spool is coupled with the body. The bail arm is configured to rotate in a counter-clockwise direction to wind fishing line onto the spool. The bail arm is configured to rotate in the counter-clockwise direction in response to a rotation of a handle in a clockwise direction. A direction of a tangential velocity of the bail arm and a direction of a tangential velocity of the handle are in a same direction as the handle rotates to approach the bail arm.

In some embodiments, the direction of the tangential velocity of the bail arm and the direction of the tangential velocity of the handle are in the same direction when the handle and the bail arm are at angular positions where the handle is most proximate the bail arm.

In some embodiments, the fishing line has a resting position having a counter-clockwise wind.

In some embodiments, the spinning reel is configured to be held in an operator's left hand and operated to rotate the handle in the clockwise direction by an operator's right hand.

In some embodiments, the bail arm is transitionable between a take-up position and a let-out position. A wind direction of the fishing line on the spool facilitates holding of the fishing line with a finger of the operator's left hand when the bail arm is in the let-out position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the FIGURES, which illustrate the exemplary embodiments in detail, it should be understood that the present application is not limited to the details or methodology set forth in the description or illustrated in the figures. It should also be understood that the terminology is for the purpose of description only and should not be regarded as limiting.

Overview

Referring generally to the FIGURES, a spinning reel is configured for a fisherman to hold the spinning reel in his left hand and rotate a handle with his right hand. The spinning reel includes a body, a bail assembly, and a spool. The spool is rotatably fixed relative to the body. The bail assembly is rotatably coupled with the body such that the bail assembly can rotate relative to the body about a longitudinal axis that extends through a center of the spool. The bail assembly can include a rotor and a bail arm that extends between two portions of the rotor. The bail assembly is configured to rotate in a counter-clockwise direction when viewed from the front as the spinning reel is operated to take-up fishing line. The handle can be operated by the fisherman's right hand to rotate in a clockwise direction (when viewed from a right side) to drive the bail assembly to rotate to take-up the fishing line. Advantageously, the direction of rotation of the bail and the direction of rotation of the handle are not in opposing directions. Therefore, as the bail assembly rotates along angular positions that are proximate the fisherman's right hand, the bail assembly is not moving in a direction that opposes the direction of motion of the fisherman's right hand. This reduces the likelihood that the fisherman's reel hand will contact the bail assembly during reeling operations. The spinning reel can include adjustable drag, anti-lock features, anti-reverse features, etc.

Left Handed Spinning Reel

Figure 1:
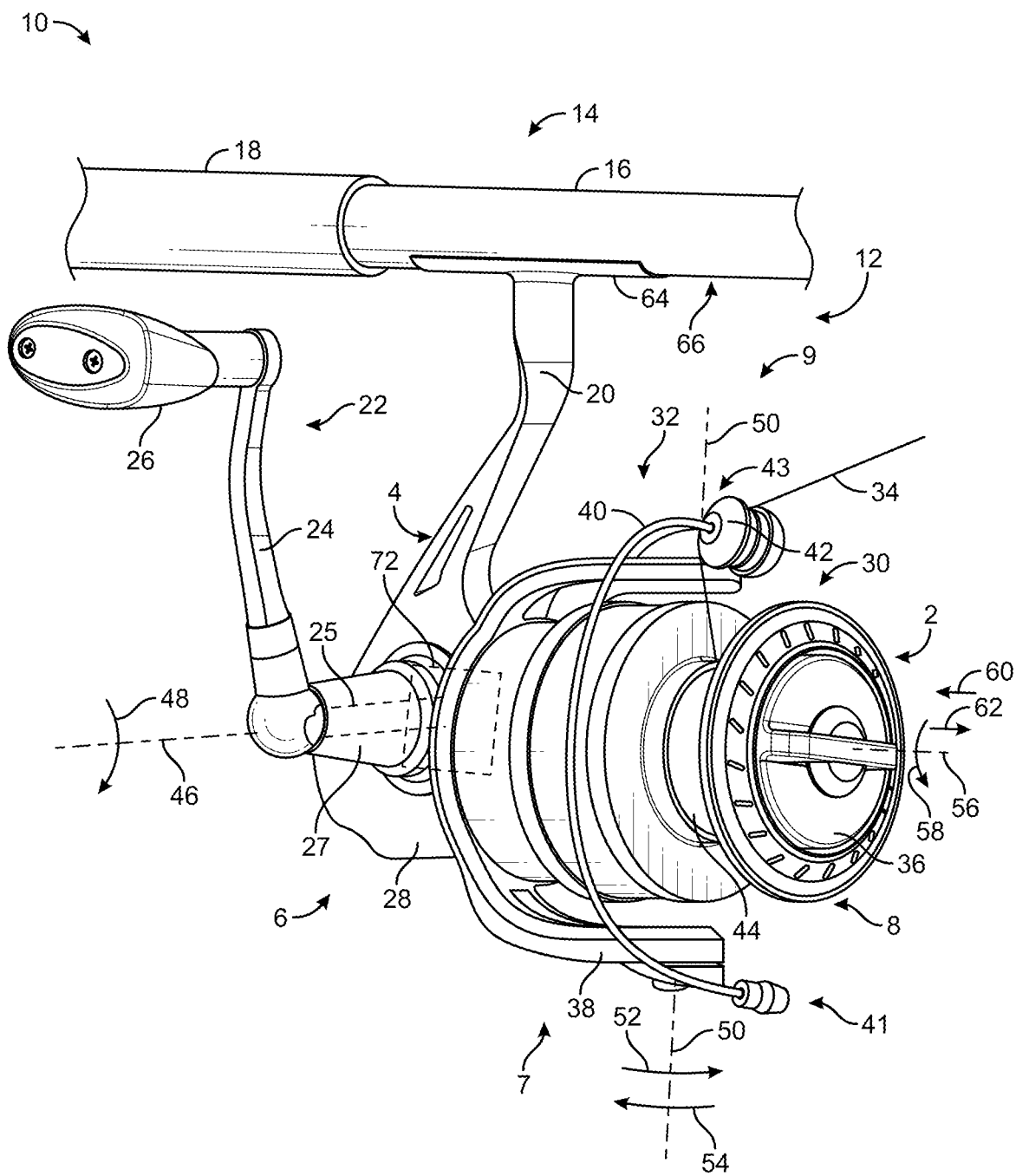
FIG. 1 is a perspective view of a left handed spinning reel, according to an exemplary embodiment.

Referring now to FIG. 1, a fishing reel, a fishing rod, a spinning reel, etc., shown as fishing rod 10 includes a reeling apparatus, a winding apparatus, a fishing line retrieval apparatus, etc., shown as spinning reel 12, according to an exemplary embodiment. Spinning reel 12 is configured to transition between a let-out state or configuration and a take-up state or configuration. In the take-up state, spinning reel 12 is configured to draw, reel, wind, etc., fishing line 34. In the let-out state, spinning reel 12 is configured to allow or facilitate the unwinding or unreeling of fishing line 34 such that fishing line 34 can be let out. Fishing rod 10 is configured to be held in the fisherman's left hand and reeled with the fisherman's right hand.

Fishing rod 10 includes a rod, a pole, a stick, an elongated member, etc., shown as rod 14, according to an exemplary embodiment. Rod 14 includes a structural portion, a blank, a pole portion, a stick portion, etc., shown as elongated portion 16. Elongated portion 16, or more generally, rod 14, can be constructed of bamboo, a metal (e.g., aluminum, steel, etc.), a composite, graphite, etc., or any other flexible material that provides sufficient structural strength for wrangling fish. Elongated portion 16 can include multiple sections (e.g., a butt, a blank, a first and second section, a first second and third section, etc.) that are connected to each other (e.g., with ferrules). In some embodiments, subsequent sections of elongated portion 16 are inserted into and fixedly coupled with prior sections of elongated portion 16. Elongated portion 16 can include one or more guides, eyelets, hooks, etc., at least partially along its entire length. The one or more guides can receive fishing line 34 therethrough and guide fishing line 34 from an outer end of elongated portion 16 to spinning reel 12.

Fishing rod 10 also includes a user interface portion, a handle, a hand portion, etc., shown as handle 18. Handle 18 can be formed onto elongated portion 16 at a position that is at least partially rearward of spinning reel 12. Handle 18 can be molded or have a shape that corresponds to a fisherman's left or right hand to facilitate an ergonomic grip of fishing rod 10. In some embodiments, handle 18 is a section that attaches to elongated portion 16 at a position that is rearward of spinning reel 12.

Elongated portion 16 includes a receiving portion, a seat, a recess, an interlocking portion, an interfacing portion, etc., shown as reel seat 66. Reel seat 66 is configured to receive and interlock with or fixedly couple with a corresponding portion or engagement member of spinning reel 12, shown as reel foot 64. Reel foot 64 can be inserted at least partially into reel seat 66 and fixedly coupled (e.g., through fasteners, interlocking portions, etc.) with elongated portion 16.

Spinning reel 12 includes a support member, a support portion, a structural member, etc., shown as support member 20. Support member 20 can be integrally formed with reel foot 64. Support member 20 may extend downwards from rod 14 such that spinning reel 12 is supported below rod 14 during operation of fishing rod 10. Spinning reel 12 includes a front end, shown as front 2, a rear or back end, shown as rear 4, a right side 6, a left side 8, a top side 9, and a bottom side 7. It should be understood that all references to "left," "right," "front," "rear," "upwards," "downwards," etc., used in the present disclosure refer to the directions, sides, portions, etc., defined by front 2, rear 4, right side 6, left side 8, top side 9, and bottom side 7.

Spinning reel 12 includes a body portion, a main portion, a housing, etc., shown as body portion 28. Body portion 28 can be integrally formed with support member 20. Body portion 28 is a hollow member that includes one or more inner volumes or inner cavities for containing, enclosing, and protecting internal components of spinning reel 12. Body portion 28 may be fixedly coupled with fishing rod 10 and provides structural support for the various components of spinning reel 12.

Spinning reel 12 includes a handle or a driving member 22, a spool 30, and a pickup or bail assembly 32. Handle 22 can be driven to rotate about axis 46 (e.g., a lateral axis) by the fisherman (e.g., by the fisherman's right hand) to reel or draw in fishing line 34. When handle 22 is driven to rotate about axis 46 by the fisherman and spinning reel 12 is in the take-up configuration/state, bail assembly 32 rotates in direction 58 about longitudinal axis 56. As bail assembly 32 rotates in direction 58 (i.e., counter-clockwise when viewed from a front end of spinning reel 12), spool 30 can translationally reciprocate along longitudinal axis 56. Bail assembly 32 guides fishing line 34 onto spool 30 as spool 30 reciprocates, thereby facilitating an even distribution of fishing line 34 onto spool 30.

Handle 22 can be driven in direction 48 about axis 46 to wind or reel fishing line 34 onto spool 30. Handle 22 includes a knob portion 26, an intermediate portion 24, and a housing portion 27. Intermediate portion 24 and knob portion 26 can be jointed and fixedly coupled with each other. Intermediate portion 24 is fixedly coupled with a shaft, a rod, a bar, a rotational member, a driving member, etc., shown as shaft 25. As handle 22 is driven to rotate about axis 46, shaft 25 also rotates about axis 46 in direction 48. Shaft 25 can input mechanical energy (e.g., rotational kinetic energy, rotation, etc.) to a gear train, a gear box, a gearing system, etc., shown as gear box 72. Gear box 72 can include any combination of bevel gears, spur gears, planetary gears, etc., to transfer the rotational kinetic energy (e.g., torque) provided by shaft 25 about axis 46 to rotational kinetic energy about longitudinal axis 56. An output of gear box 72 can drive bail assembly 32 to rotate about longitudinal axis 56 in direction 58. As handle 22 is rotated in direction 48 about longitudinal axis 56, torque is transferred through shaft 25 to gear box 72 which is transferred to rotation of bail assembly 32 about longitudinal axis 56 in direction 58 to wind or reel or retract fishing line 34.

Gear box 72 can be positioned within body portion 28. Shaft 25 extends through housing portion 27. Housing portion 27 can be fixedly coupled with body portion 28 to enclose and cover shaft 25. Shaft 25 can be supported by one or more bearings (e.g., ball bearings, roller bearings, etc.) within housing portion 27 and/or body portion 28. Gear box 72 can include helical gears, spur gears, bevel gears, etc., to transfer rotational kinetic energy from axis 46 to longitudinal axis 56. In some embodiments, gear box 72 is configured to increase speed output about longitudinal axis 56 (e.g., a speed $\omega_{bail}$ at which bail assembly 32 rotates) given rotational kinetic energy at speed $\omega_{handle}$ about axis 46 (i.e., such that $\omega_{bail} > \omega_{handle}$). In this way, a single rotation of handle 22 about axis 46 in direction 48 can drive bail assembly 32 to rotate multiple times about longitudinal axis 56 in direction 58.

Bail assembly 32 can be rotatably coupled with body portion 28 such that bail assembly 32 is free to rotate at least in direction 58 about longitudinal axis 56 relative to body portion 28. Bail assembly 32 can be rotatably coupled with body portion 28 using one or more bearings to facilitate improved mechanical efficiency of spinning reel 12. Bail assembly 32 includes a rotor, a rotatable member, etc., shown as rotor 38. Rotor 38 can have a general U-shape and is rotatably coupled with body portion 28. Rotor 38 includes a first end, a first portion, a feed end, a guide end, etc., shown as first end 41. Rotor 38 also includes a second end, a second portion, a support end, etc., shown as second end 43. Rotor 38 is configured to receive output rotational kinetic energy from gear box 72 such that rotor 38 is driven to rotate about longitudinal axis 56 in direction 58 as handle 22 is driven to rotate about axis 46 in direction 48. First end 41 and second end 43 of rotor 38 can be positioned on opposite sides of spool 30. For example, first end 41 may be positioned at an angular position that is 180 degrees from second end 43 about longitudinal axis 56.

Bail assembly 32 includes a bail arm, a feeder, a take up, a bail, etc., shown as bail arm 40. Bail arm 40 is an elongated arcuate or curved member that extends between first end 41 and second end 43 of rotor 38. Bail arm 40 can be fixedly coupled at opposite ends with intermediate members that pivotally couple with first end 41 and second end 43 of rotor 38. Bail arm 40 is pivotally coupled with rotor 38 such that bail arm 40 can be rotated about axis 50 between a take-up position (as shown in FIG. 1) and a let-out position. Axis 50 can extend through first end 41 and second end 43 of rotor 38 at the pivotal coupling between rotor 38 and bail arm 40.

Bail arm 40 can be transitioned (e.g., manually) out of the take-up position (as shown in FIG. 1) and into the let-out position by rotating bail arm 40 in direction 52 about axis 50 (e.g., 90 degrees). Likewise, bail arm 40 can be transitioned (e.g., manually) out of the let-out position to the take-up position (as shown in FIG. 1) by rotating bail arm 40 in direction 54 (e.g., a direction that is opposite direction 52) about axis 50 (e.g., 90 degrees).

Bail assembly 32 includes a line roller, a guide member, etc., shown as roller 42. Roller 42 is positioned at second end 43 of rotor 38. Roller 42 is configured to engage and guide fishing line 34 to wind fishing line 34 onto spool 30 when bail arm 40 is in the take-up position. Roller 42 can be translationally fixedly coupled with the intermediate member that pivotally couples with rotor 38. In this way, as bail arm 40 is rotated in direction 52 or direction 54 about axis 50, roller 42 also rotates. When bail arm 40 is transitioned into the take-up position as shown in FIG. 1, roller 42 is configured to engage and guide fishing line 34 for take-up, winding onto spool 30, and retrieval of fishing line 34. When bail arm 40 is transitioned into the let-out position, roller 42 is moved to a position such that roller 42 does not engage fishing line 34 (e.g., during casting) and fishing line 34 is free to unspool or unravel from spool 30.

As handle 22 is driven to rotate about axis 46 in direction 48, gear box 72 transfers the rotational kinetic energy to bail assembly 32 and drives bail assembly 32 to rotate about longitudinal axis 56 in direction 58 to retrieve fishing line 34 and wind fishing line 34 onto spool 30 in a counter-clockwise direction (e.g., as viewed from the front of spinning reel 12). Longitudinal axis 56 extends through a center of spool 30. In some embodiments, rotor 38 and spool 30 are both positioned centrally at longitudinal axis 56. Spool 30 is configured to reciprocate translationally along longitudinal axis 56 (e.g., in directions 60 and 62) to facilitate even distribution of fishing line 34 onto spool 30.

Spool 30 can include a receiving surface, a spool surface, a cylindrical surface, etc., shown as spool surface 44. An end of fishing line 34 can be fixed or secured with spool surface 44. As bail assembly 32 rotates to retrieve fishing line 34, roller 42 engages fishing line 34 and winds fishing line 34 onto spool surface 44. Spool surface 44 reciprocates with spool 30. In some embodiments, spool 30 is configured to be driven to reciprocate longitudinally by gear box 72 (e.g., using internal gearing, shafts, threaded rods, etc.). In this way, driving handle 22 to rotate in direction 48 about axis 46 both drives reel assembly 32 to rotate in direction 58 about longitudinal axis 56 and drives spool 30 to translationally reciprocate along longitudinal axis 56 to retrieve fishing line 34 and wind fishing line 34 onto spool surface 44 (or onto fishing line 34 that is already wound onto spool surface 44).

Spool 30 can also include a knob, a drag adjuster, etc., shown as knob 36. Knob 36 can be driven to rotate about longitudinal axis 56 in either direction to increase or decrease drag exerted on bail assembly 32. For example, if the fisherman is reeling fishing line 34 with bail assembly 32 in the take-up position, a fish at the end of fishing line 34 may pull back on fishing line 34, thereby driving reel assembly 32 to rotate about longitudinal axis 56 in a direction that is opposite direction 58. A drag mechanism (e.g., a brake) can be used to provide a frictional force to bail assembly 32 (e.g., to rotor 38) as bail assembly 32 and/or rotor 38 rotate in the direction opposite direction 58 (e.g., in the clockwise direction).

Figure 2:
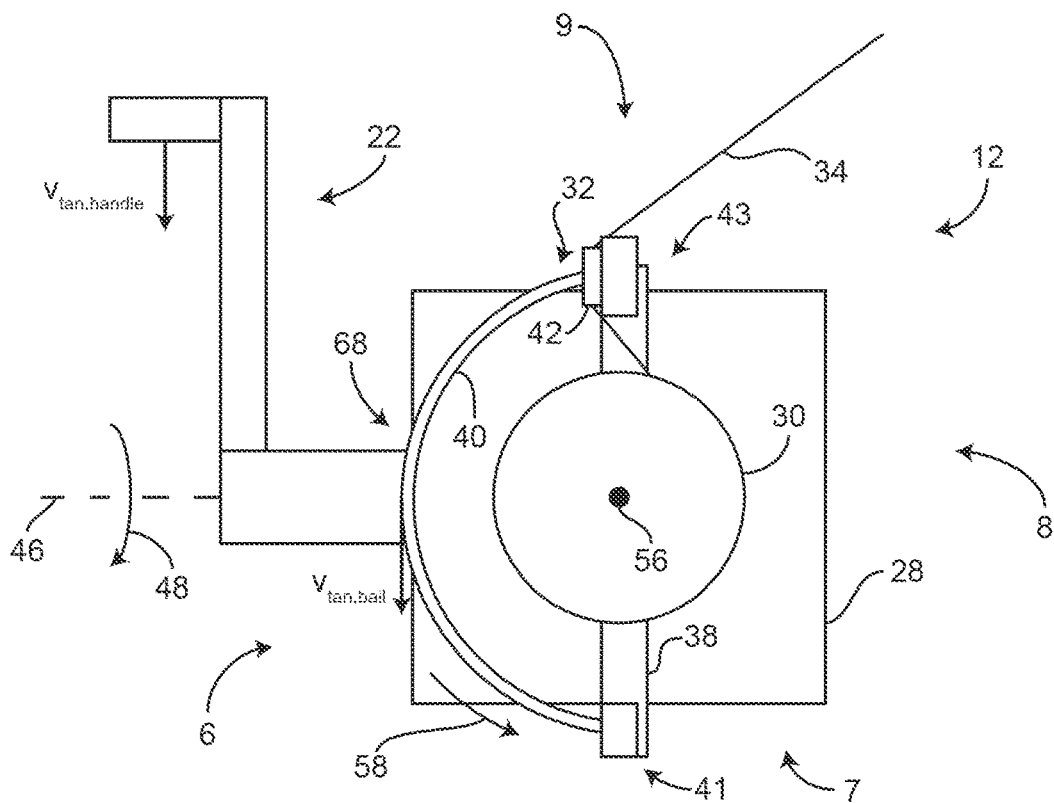
FIG. 2 is a front view of the left handed spinning reel of FIG. 1 in a first configuration, according to an exemplary embodiment.
Figure 3:
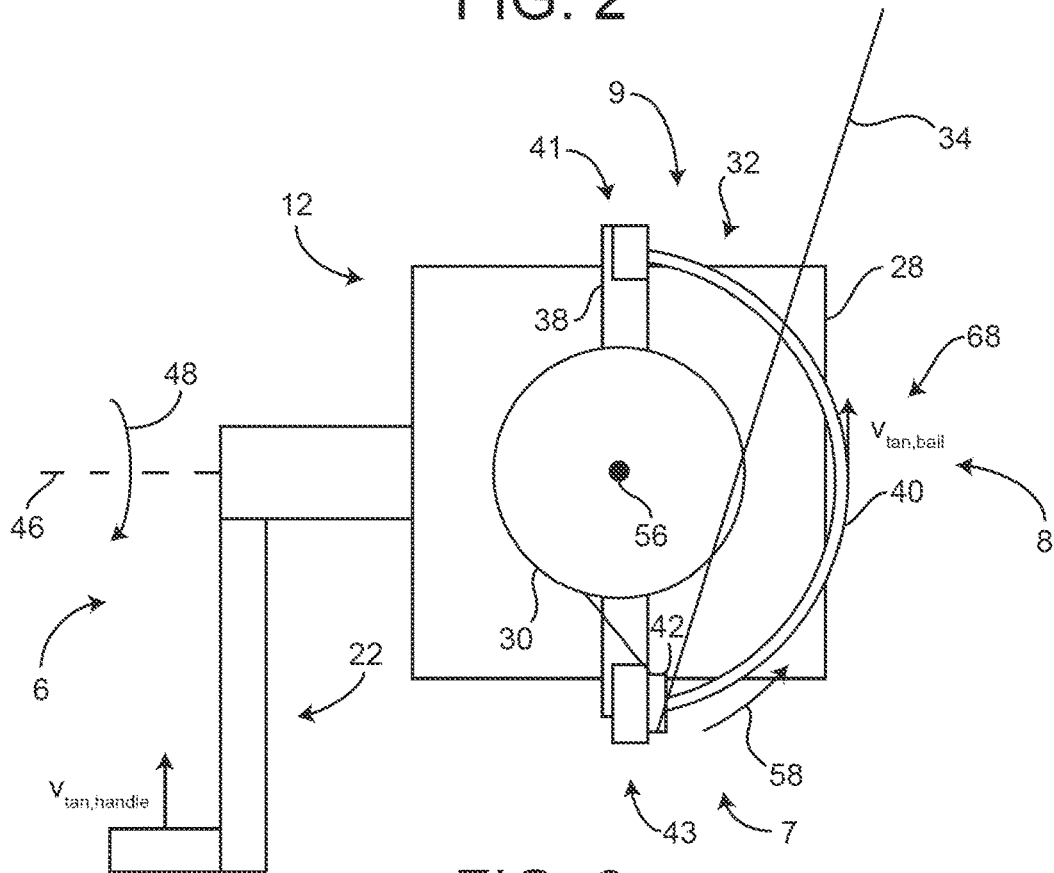
FIG. 3 is a front view of the left handed spinning reel of FIG. 1 in a second configuration, according to an exemplary embodiment.

Referring now to FIGS. 2-3, spinning reel 12 is shown from a front view during a reeling operation. Bail assembly 32 rotates in a counter-clockwise direction (i.e., direction 58) about longitudinal axis 56 as handle 22 is driven to rotate about axis 46 in direction 48. A fisherman can grasp handle 18 with his left hand and operate spinning reel 12 with his right hand (by rotating handle 22 in direction 48). Other spinning reels are configured such that driving the handle causes the bail to rotate in a clockwise direction. This results in the fishing line being wound onto the reel in the clockwise direction. For a fisherman that holds the fishing rod in his left hand and reels with his right hand, this is disadvantageous for reasons described herein below.

As bail assembly 32 rotates from the position shown in FIG. 3 to the position shown in FIG. 2 in the counter-clockwise direction, an outer portion 68 of bail assembly 32 moves in a tangential direction relative to longitudinal axis 56 and direction 58 with velocity $v_{tan,bail}$. Likewise, as the fisherman rotates handle 22 about axis 46 in direction 48, the fisherman's hand and handle 22 move in a tangential direction relative to axis 46 and direction 48 with a velocity $v_{tan,handle}$. When the fisherman rotates handle 22 from the position shown in FIG. 2 to the position shown in FIG. 3, the fisherman's hand and handle 22 move downwards (e.g., towards bottom 7) and towards front 2 of spinning reel 12. During this motion, bail assembly 32 may rotate several times in direction 58. When bail assembly 32 rotates along angular positions such that bail arm 40 and/or rotor 38 extend towards the fisherman's hand (e.g., towards the right side 6 of spinning reel 12), the direction of rotation of bail assembly 32 does not oppose the direction of rotation of the fisherman's hand and handle 22 (if the fisherman's hand and handle 22 are rotating from the positions shown in FIG. 2 to the position shown in FIG. 3 in direction 48).

However, if bail assembly 32 were configured to rotate in the clockwise direction as other spinning reels are configured, at the position of bail assembly 32 shown in FIG. 2, bail assembly 32 and rotor 38 would move towards the direction of motion of the fisherman's hand (e.g., outer portion 68 would move in a direction opposite $v_{tan,bail}$). Depending on the size and configuration of the spinning reel, this can cause the fisherman's reel hand (i.e., the fisherman's right hand) to contact bail assembly 32. Furthermore, as the fisherman's hand moves from an upper position to a medial front position to a lower position (e.g., as the fisherman's hand rotates handle 22 from the position shown in FIG. 2 to the position shown in FIG. 3 in direction 48), the bail and the rotor would rotate in a direction that is towards the fisherman's hand and towards the handle. Advantageously, since bail assembly 32 rotates in the counter-clockwise direction as viewed from the front, the fisherman's hand and handle 22 move in a direction that does not oppose the direction of rotation of bail assembly 32 (e.g., $v_{tan,handle}$ and $v_{tan,bail}$ do not point in opposing directions).

Advantageously, bail assembly 32 rotates in the counter-clockwise direction (as viewed from the front) to wind fishing line 34 onto spool 30 in the counter-clockwise direction. This facilitates allowing the fisherman to grasp fishing line 34 with his left index finger (e.g., the hand holding the rod) without fishing line 34 unravelling from spool 30 (until the fisherman releases fishing line 34 with his left finger) for casting operations. This is due to the counter-clockwise winding of fishing line 34 on spool 30 and facilitates left handed casting. Other spinning reels that wind the fishing line onto the spool in the clockwise direction are disadvantageous for left-handed casting, since it is difficult (if not impossible) for the fisherman to grasp the fishing line with his left index finger. Due to memory in the fishing line and the clockwise winding of the fishing line onto the spool, grasping the fishing line with the left index finger would result in the fishing line unravelling from the spool, thereby preventing the fisherman from performing a cast with his left hand. However, bail assembly 32 rotates in the counter-clockwise direction (i.e., direction 58 as viewed from the front) and winds fishing line 34 onto spool 30 in the counter-clockwise direction and the fishing line 34 may have memory so that the fishing line 34 tends to wind into a counter-clockwise direction (e.g., a same direction as rotation of spool 30 during take-up). This facilitates allowing the fisherman to grasp fishing line 34 with one of his left hand's fingers (e.g., the left index finger) while holding fishing rod 10 in his left hand for a fully left-handed cast without fishing line 34 unravelling from spool 30.

For example the fishing line 34 may have a resting position that is a spooled position due to the memory in the fishing line 34. The spooled position that the fishing line 34 tends towards (e.g., the rest position, natural position, etc.) may have a counter-clockwise wind direction. In this way, the fishing line 34 is specifically configured for use with spinning reel 12.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A fishing reel comprising:
  a bail assembly configured to retrieve or let out a fishing line, the bail assembly comprising:
    a rotor; and
    a bail arm extending from a line roller at a first end of the rotor in a counter-clockwise direction to a second end of the rotor as viewed from a front of the fishing reel;
  wherein the bail assembly is configured to be driven by an input torque to retrieve the fishing line.

2. The fishing reel of claim 1, further comprising an input shaft configured to receive the input torque, and a gear box configured to be driven by the input shaft and drive the bail assembly to retrieve the fishing line, wherein the fishing reel is configured for use by a left-handed operator, wherein the input shaft is configured to receive the input torque from a right hand of the left-handed operator.

3. The fishing reel of claim 1, further comprising an input shaft configured to receive the input torque, a gear box configured to be driven by the input shaft and drive the bail assembly to retrieve the fishing line, and a support member, the bail assembly coupled with the support member, wherein the support member is configured to fixedly couple with a pole, wherein:
  the input shaft extends laterally outwards along a first axis from a right side of the fishing reel and a clockwise direction is defined along the first axis extending centrally through the input shaft; and
  the bail assembly is centered about a second axis, the second axis substantially perpendicular with the first axis that extends centrally through the input shaft, wherein the bail assembly is configured to operate in the counter-clockwise direction about the second axis to retrieve the fishing line.

4. The fishing reel of claim 1, wherein the bail assembly comprises:
  a spool;
  wherein the rotor, the bail arm, and the line roller rotate in the counter-clockwise direction relative to the spool to retrieve the fishing line and wind the fishing line onto the spool.

5. The fishing reel of claim 4, wherein the bail arm, the line roller, and the spool are transitionable between a take up position and a let out position to configure the fishing reel to take up or let out the fishing line.

6. The fishing reel of claim 1, further comprising a handle rotatably coupled with an input shaft, wherein the handle is configured to receive the input torque from an operator's right hand and transfer the input torque to the input shaft to drive the bail arm.

7. The fishing reel of claim 6, wherein a direction of rotation of the handle and a direction of rotation of the bail assembly during take-up of the fishing line do not oppose each other.

8. A fishing rod comprising:
  an elongated member; and
  a fishing reel comprising:
    a bail assembly configured to retrieve or let out a fishing line;
    an input shaft irreversibly mounted on a side of the fishing reel and configured to receive an input torque; and
    a gear box configured to be driven by the input shaft from only the side of the gear box, and drive the bail assembly to retrieve the fishing line.

9. The fishing rod of claim 8, wherein the fishing rod is configured to be held with an operator's left hand and operated with an operator's right hand.

10. The fishing rod of claim 8, wherein:
  the input shaft extends laterally outwards along a first axis from a right side of the fishing reel and a clockwise direction is defined along the first axis extending centrally through the input shaft; and
  the bail assembly is centered about a second axis, the second axis substantially perpendicular with the first axis that extends centrally through the input shaft, wherein the bail assembly is configured to operate in a counter-clockwise direction about the second axis to retrieve the fishing line.

11. The fishing rod of claim 8, wherein the bail assembly comprises:
  a bail arm extending between opposite portions of a rotor;

a roller positioned at an end portion of the rotor, wherein the bail arm terminates at the roller; and a spool;

wherein the rotor, the bail arm, and the roller rotate in a counter-clockwise direction relative to the spool to retrieve the fishing line and wind the fishing line onto the spool.

12. The fishing rod of claim 11, wherein the bail arm, the roller, and the spool are transitionable between a take up position and a let out position to take up or let out the fishing line.

13. The fishing rod of claim 8, further comprising a handle rotatably coupled with the input shaft, wherein the handle is configured to receive the input torque from an operator's right hand and transfer the input torque to the input shaft.

14. The fishing rod of claim 13, wherein a direction of rotation of the handle and a direction of rotation of the bail assembly during take-up of the fishing line do not oppose each other.

15. The fishing rod of claim 8, wherein the fishing line has a rest position in a coiled position, the coiled position having a counter-clockwise wind direction to configure the fishing line for use with the fishing reel.

16. A left-handed spinning reel, the left-handed spinning reel comprising:

a body;

a spool coupled with the body; and a bail assembly comprising:

a rotor; and a bail arm;

wherein the bail arm extends from a guide member for a fishing line at a first end of the rotor in a counter-clockwise direction to a second end of the rotor.

17. The left-handed spinning reel of claim 16, wherein the rotor and the bail arm are configured to rotate in the counter-clockwise direction to wind the fishing line onto the spool in response to a rotation of a handle in a clockwise direction, the handle irreversibly mounted on one side of the body, wherein a direction of a tangential velocity of the bail arm and a direction of a tangential velocity of the handle are in the same direction when the handle and the bail arm are at angular positions where the handle is most proximate the bail arm.

18. The left-handed spinning reel of claim 16, wherein the fishing line of the left-handed spinning reel has a resting position having a counter-clockwise wind.

19. The left-handed spinning reel of claim 16, wherein the left-handed spinning reel is configured to be held in an operator's left hand and operated to rotate a handle in a clockwise direction by an operator's right hand.

20. The left-handed spinning reel of claim 16, wherein the bail arm is transitionable between a take-up position and a let-out position, wherein a wind direction of the fishing line on the spool facilitates holding of the fishing line with a finger of an operator's left hand when the bail arm is in the let-out position.

\* \* \* \* \*